United States Patent
McMorris et al.

(10) Patent No.: US 6,371,268 B1
(45) Date of Patent: Apr. 16, 2002

(54) RETENTION MECHANISM FOR VEHICLE WHEEL ASSEMBLY

(75) Inventors: Michael L. McMorris, Milwaukie; Bryan M. Averill, Portland, both of OR (US); Evan R. Baker, Camas, WA (US); Kip E. Clohessy, Milwaukie, OR (US); Fred L. Ewer, Clackamas, OR (US); Mark J. Fogelberg, Milwaukie, OR (US); Thomas W. Giacomini, Livonia, MI (US); Randy C. Karambelas, Milwaukie; Peter A. Lines, Portland, both of OR (US); John M. McCalla, Ferndale, MI (US); Scott J. Pugliese, Portland, OR (US)

(73) Assignee: Warn Industries, Inc., Milwaukie, OR (US)

( * ) Notice: Subject to any disclaimer, the term of this patent is extended or adjusted under 35 U.S.C. 154(b) by 0 days.

(21) Appl. No.: 09/661,479

(22) Filed: Sep. 14, 2000

(51) Int. Cl.⁷ ................................................. F16D 11/04
(52) U.S. Cl. ................................... 192/69.41; 192/69.9
(58) Field of Search .............................. 192/69.9, 69.4, 192/69.41, 85 A, 85 V; 301/124.1, 126, 132, 135

(56) References Cited

U.S. PATENT DOCUMENTS

| | | | |
|---|---|---|---|
| 4,893,960 A | 1/1990 | Beier | |
| 5,353,890 A | 10/1994 | Clohessy | |
| 5,366,300 A | 11/1994 | Deane | |
| 5,443,316 A | 8/1995 | Deane | |
| 5,740,895 A * | 4/1998 | Bigley | 192/69.41 |
| 5,984,422 A | 11/1999 | Seifert | |
| 6,082,514 A * | 7/2000 | Averill | 192/69.42 |
| 6,089,673 A | 7/2000 | Wiacek | |
| 6,109,411 A | 8/2000 | Bigley | |
| 6,170,628 B1 * | 1/2001 | Bigley | 192/69.41 |
| 6,234,289 B1 * | 5/2001 | Baker et al. | 192/69.41 |

OTHER PUBLICATIONS

Internet Web Pages: http://www.joining tech.com/Friction.htm, http://www.tiac.net/users/nctinc/index.html, http://www.tiac.net/users/nctinc/net_narr.htm, http://www.tiac.net/users/nctinc/net_char.jpg.

* cited by examiner

Primary Examiner—Charles A Marmor
Assistant Examiner—Saúl Rodríguez
(74) Attorney, Agent, or Firm—Robert L. Harrington

(57) ABSTRACT

A wheel end assembly including a live spindle secured to a wheel hub at an outboard end. A bearing surrounding the spindle and abutted against a shoulder on the spindle. Said bearing preloaded by a retention structure that slidably engages the bearing to compress the bearing against the shoulder. A clutch ring slidably engages splines associated with the live spindle and with an axle portion to connect and disconnect the axle to the live spindle and accordingly the wheel hub.

2 Claims, 11 Drawing Sheets

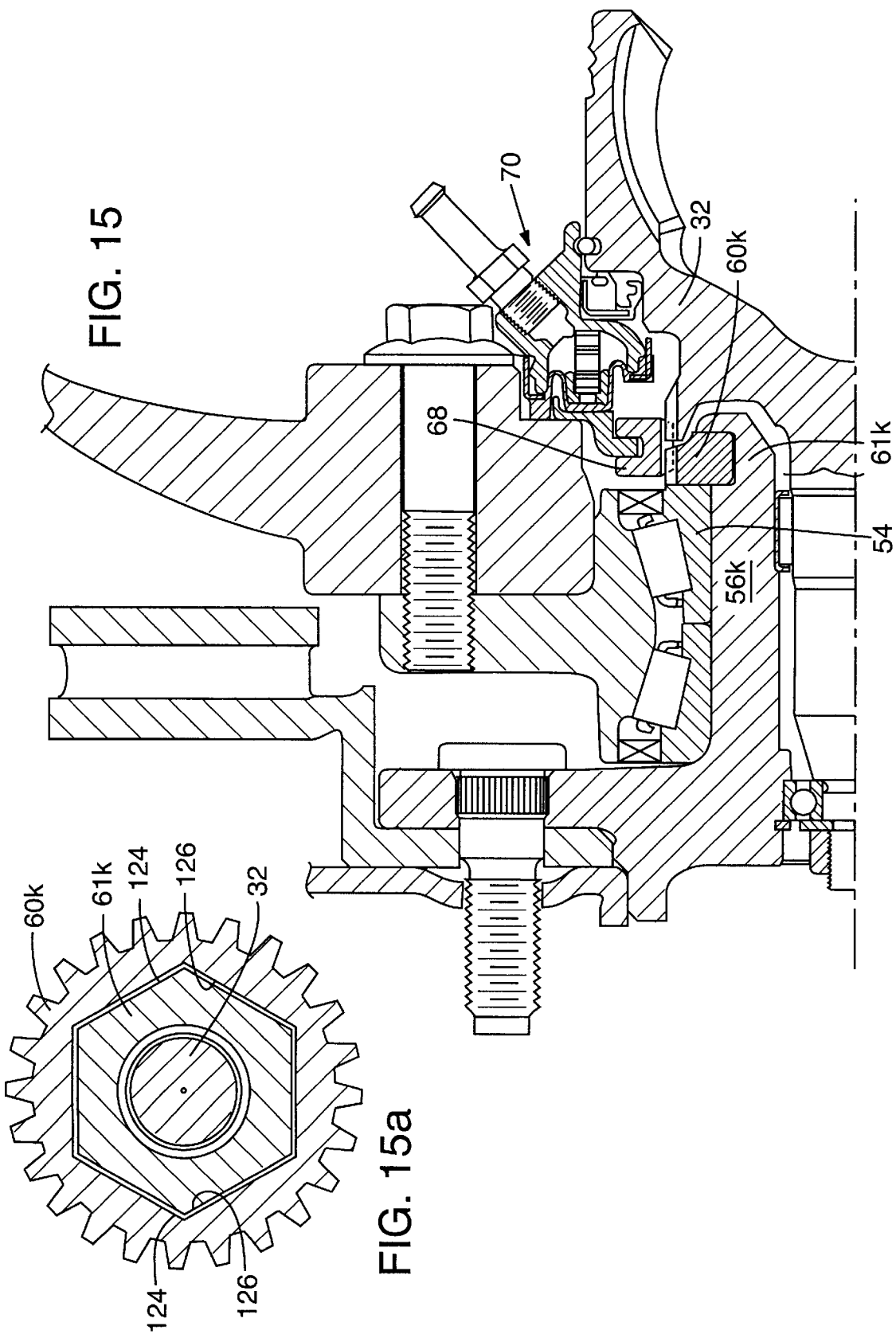

RETENTION MECHANISM FOR VEHICLE WHEEL ASSEMBLY

FIELD OF THE INVENTION

This invention relates to a wheel end assembly for a vehicle having optional two-wheel/four-wheel drive including wheel bearings used for rotatably mounting a wheel hub to a vehicle frame, and more particularly to the manner of retaining the bearings to the wheel hub.

BACKGROUND OF THE INVENTION

A recent advance in the development of wheel end assemblies for vehicles having optional two-wheel/four-wheel drive is the inboard positioning of the clutch mechanism. Such is described in the commonly owned U.S. Pat. No. 5,740,895. Whereas previously the axle protruded outwardly into the wheel hub whereat the wheel was mounted and a clutch ring within the wheel hub was actuated to connect and disconnect the axle from the hub, in the '895 patent the wheel hub is provided with an inwardly extending integral spindle portion and the clutch ring and actuator therefor are positioned at the inboard end of the spindle portion.

In this inboard connection system, the inboard end of the spindle and an adjacent part of the axle are provided with matching splines and the clutch ring traverses between engagement with the splines of one only and then engagement with both spindle and axle.

The wheel hub is rotatably mounted to the vehicle suspension, e.g., the knuckle, with high performance bearings. A primary consideration is the proper mounting of the bearing. They need to be compressed, i.e., preloaded to a precise load, and maintained at that load. In the '895 patent, preloading is provided by a spindle nut screwed onto the spindle at the outboard end. An integral flange at the inboard end of the spindle provides the splines for clutch ring engagement and also provides a shoulder against which the bearings are compressed.

A subsequent development disclosed in the U.S. Pat. No. 5,984,422 provides an integral flange at the outboard end. The inboard end is splined and a coupler having radially inwardly directed splines is slid onto the splined end of the spindle. The coupler is also provided with radially outwardly directed splines that provide for clutch ring engagement. A nut is screwed onto a threaded portion of the spindle's inboard end to compress/preload the coupler against the bearings and then the spindle end is roll formed against the nut to secure the nut and thereby maintain the preload on the bearings.

Alternate versions of the '422 disclosure eliminate the nut and provide and maintain the preload of the bearings through direct roll forming of the spindle against the coupler. It will be appreciated that the manner of mounting the coupler to the spindle must provide rotative driving torque from the axle to the wheel hub which is typically accomplished by a matching spline fit between the coupler and the spindle and between the coupler and the clutch ring.

BRIEF DESCRIPTION OF THE PRESENT INVENTION

The present invention is directed to improved and alternative mechanism and structure primarily at the inboard end of the spindle for providing clutch ring engagement and preloading and maintenance of the preload of the bearings.

One version provides roll forming of the spindle end directly against the bearing with a coupler fitted (e.g., spline fit) to the inner diameter of the spindle and wrapping around and outside the roll formed end. (FIGS. 4 and 4a)

A second version provides the inboard end of the inner race of the bearings with inner splines (inwardly directed) fitted to the spindle, and exterior splines for receiving a clutch ring. (FIG. 5)

A third version provides an inner race with screw threads that screw onto the spindle. A lock ring secures the inner race of the bearing at the desired preload and the spindle end is provided with splines for receiving the clutch ring. (FIG. 6)

A fourth version provides a coupler having, e.g., dog lugs in axial engagement with the spindle end. The coupler is compressed against the bearing inner race and is roll formed under a lip provided on the inner diameter of the spindle end. (FIG. 7)

A fifth version provides a coupling that is spline fitted to the spindle and abuts the bearing race. A circular groove at the outer diameter of the spindle end is configured to receive a formed retention ring that is cam fitted to the groove to compress and retain the bearings. A variation to this version is the use of a split ring cam fit to slot and retained by a retainer band. (FIGS. 8 and 8a)

A sixth version provides a groove in the exterior diameter of the spindle end. A coupler slides into place over the groove and is then press fit into the groove and against the bearing race. Splines for clutch ring engagement are subsequently formed into the coupler exterior. (FIG. 9)

A seventh version provides the spindle end with fingers. A coupler has mated slots and slides onto the fingers and against the bearing race. The fingers are then press formed in the manner of a rivet head to secure and retain the preload on the bearings. (FIGS. 10 and 10A)

An eighth version provides spline or screw thread engagement of a coupler onto a spindle end and against the bearing race. Cavities are provided for receiving molten metal when the desired preload is obtained which hardens and fixes the coupler to the spindle. (FIG. 11)

A ninth version provides a desired interfit of a coupler to the spindle end and bearing race whereby as fitted the desired preload is achieved. The coupler is spin welded (friction welded) to the spindle end to maintain the preload. (FIGS. 12, 12A and 12B)

A tenth version provides a formed seat at the end of the spindle for receiving a mated coupler that is compressed against the bearing race and welded (conventional welding) to the spindle end. (FIGS. 13, 13A and 13B)

An eleventh version includes a coupler spine fit to the exterior of the spindle inboard end, a retainer screw threaded to the inner diameter of the spindle end, and a lock washer between the retainer and coupler that locks the retainer at the desired compression. (FIG. 14) This version in particular is also adapted for application to the outboard end of the spindle, i.e., an inboard flange providing a shoulder as illustrated in the '895 patent. (FIG. 14A)

A twelfth version provides a spindle inner end configured in a polygonal form (hexagonal, octagonal, etc.) or other form such as double D or key and key slot, with a coupler similarly configured and fitted to the spindle end which is then roll formed against the coupler. (FIGS. 15 and 15A)

A thirteenth version provides the spindle end with a negative angle and a coupler is force fit onto the spindle end, e.g. the bearing being cold and the coupler heated to expand the inner circumference. (FIG. 16) Alternatively dowel pins can be force fit into the interfitted coupler and bearing. (FIG. 16A)

The above versions are all directed to the same desired end result, i.e., the preloading of wheel bearings, primarily from the inboard end of a wheel hub extension/spindle; and incorporating a coupler secured to the spindle and designed to be engaged by a clutch ring and thereby secured to an axle for four-wheel drive; and with a retention mechanism that insures retention of the preloaded force against the bearings.

BRIEF DESCRIPTION OF THE DRAWINGS

FIGS. 4–16 are views of alternate embodiments of the invention.

DETAILED DESCRIPTION

Figure 1:
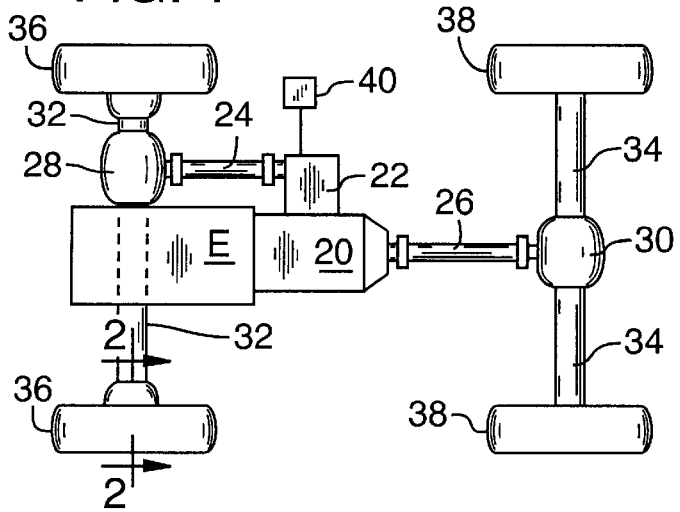
FIG. 1 illustrates a vehicle having optional two-wheel/four-wheel drive capability in accordance with the invention.

FIG. 1 illustrates schematically a vehicle chassis including an engine E, a transmission 20, a transfer case 22 and front and rear propeller shafts 24, 26 connected to front and rear differentials 28, 30 connected to front and rear axles 32, 34 that engage front and rear wheels 36, 38.

A shift mechanism 40 interconnected to the transmission or the transfer case produces driving rotation or interrupts driving rotation from the engine E to propeller shaft 24 and thus to axles 32 and wheels 36. It is desirable to also disconnect the wheels from the axles when the shift mechanism disconnects driving power from the engine. Otherwise the mechanism including propeller shaft 24 differential gears and differential 28 and axles 32 will be driven by wheels 36 resulting in undesired power loss and drive line wear. The invention is directed to the mechanism that connects/disconnects the axles 32 from the wheels 36.

Figure 2:
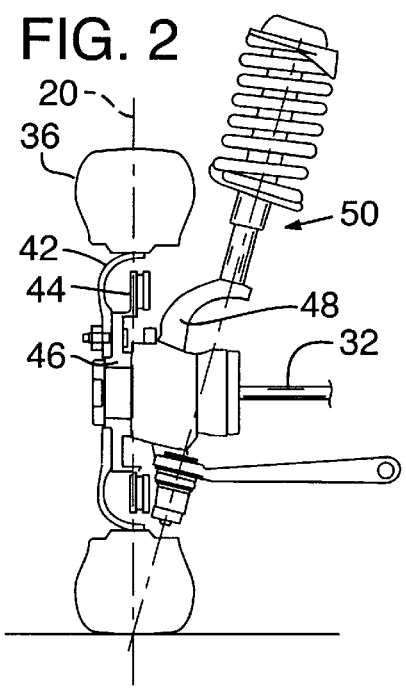
FIG. 2 taken on section lines 2—2 of FIG. 1 illustrates a wheel end of the vehicle of FIG. 1 wherein the present invention is incorporated.

FIG. 2 illustrates somewhat schematically a wheel end assembly including a wheel 36, wheel rim 42, a brake rotor 44 and wheel hub 46. The wheel hub is rotatably mounted to a knuckle 48 carried by a shock absorber 50.

Figure 3:
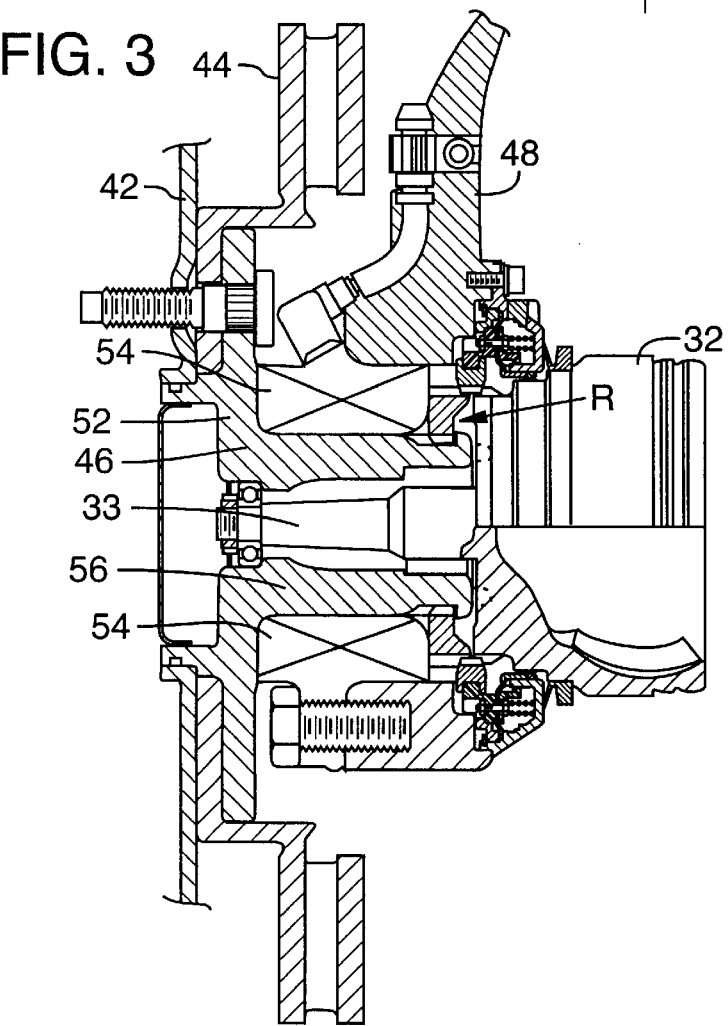
FIG. 3 illustrates the components of FIG. 2 in cross section and particularly the arrangement of the inboard end of the wheel hub/spindle whereat the coupler retention/bearing preload mechanism of the present invention is applied.

FIG. 3 is a sectional view of the wheel end assembly of FIG. 2. As will be noted, the wheel hub 46 includes an integral outboard flange 52 which provides an outboard shoulder for wheel bearing 54. The wheel bearing 54 rotatably supports the wheel hub 46 and wheel 36 (shown in FIG. 2) relative to the non-rotating knuckle 48 mounted to or part of the vehicle frame (not otherwise shown).

The wheel hub has an inwardly directed extension 56 which will be sometimes referred to as a spindle or spindle portion. As illustrated, the inboard end of the spindle portion 56 terminates at a position inward of bearing 54. A retention structure R secures the bearing 54 to the spindle 56. It is the retention structure R and related components (coupler) to which the present invention is directed. The preferred and alternate embodiments thereof are described in detail hereafter. Adjacent the inner end of the spindle 56 is a CV joint that is a continuation of the axle 32 and they will be collectively hereafter referred to as axle 32.

Axle 32 has a reduced configuration 33 that extends outwardly into and partially through the spindle/wheel hub 56.

Figure 4:
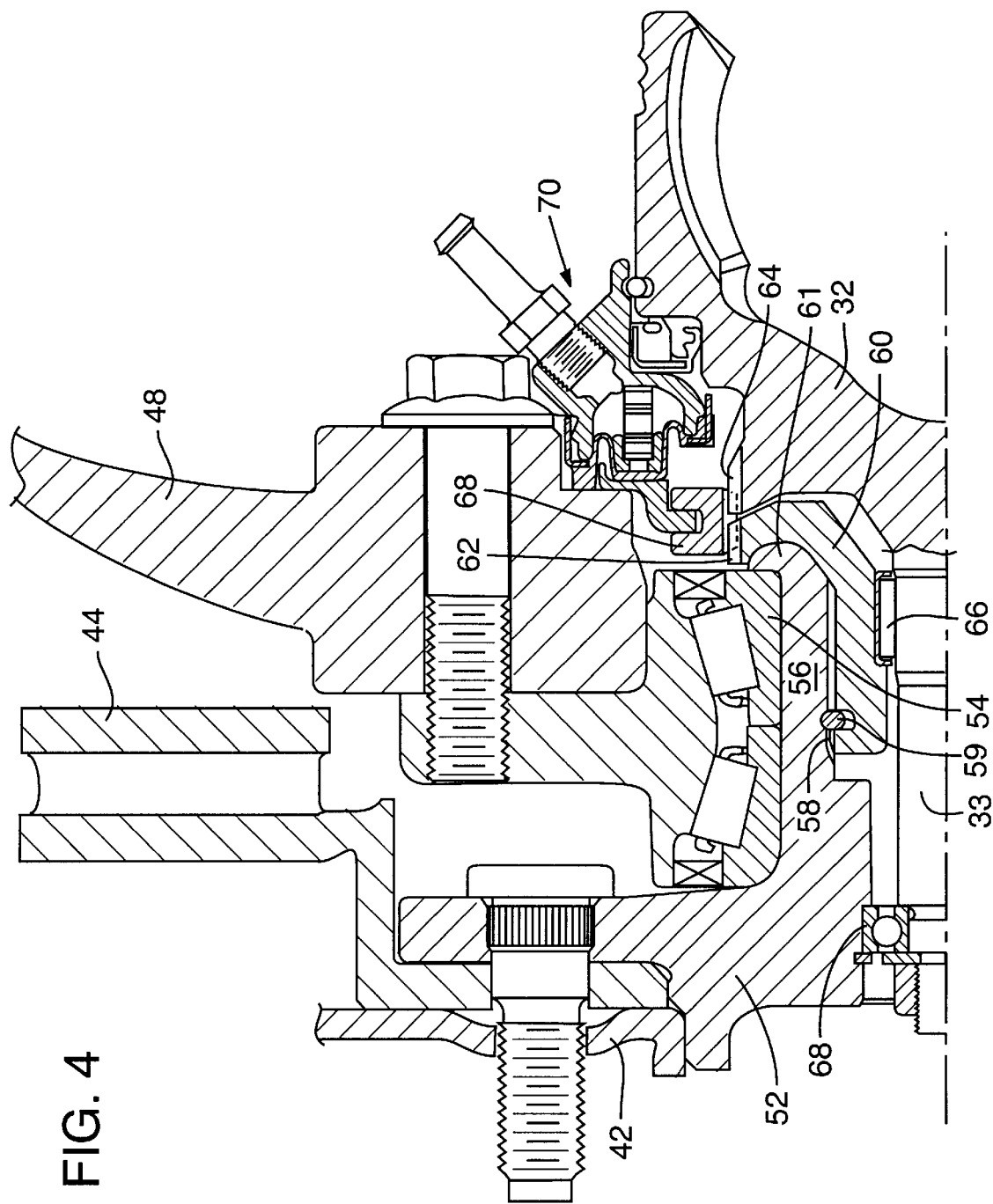

Reference is now made to FIG. 4 which is an enlarged view of the first version/embodiment of the invention. As shown, the inner diameter at the inner end of the spindle 56 is increased and provided with splines 58. The extreme inboard end 61 is roll formed against the bearing 54 in a controlled manner to achieve the desired preload and to also maintain that preload.

A coupler 60 is spline fit to the inner diameter splines 58 of spindle 56. A lock ring 59 secures the coupler 60 at the desired position. As shown, the inboard end of the coupler 60 wraps around the end 61 of the spindle and is provided with splines 62. An adjoining portion of axle 32 is provided with matching splines 64. The axle 32 is rotatably supported at end 33 by bearings 66 and 68 to allow rotation of the axle 32 relative to the coupler 60 and spindle 56.

Figure 4A:
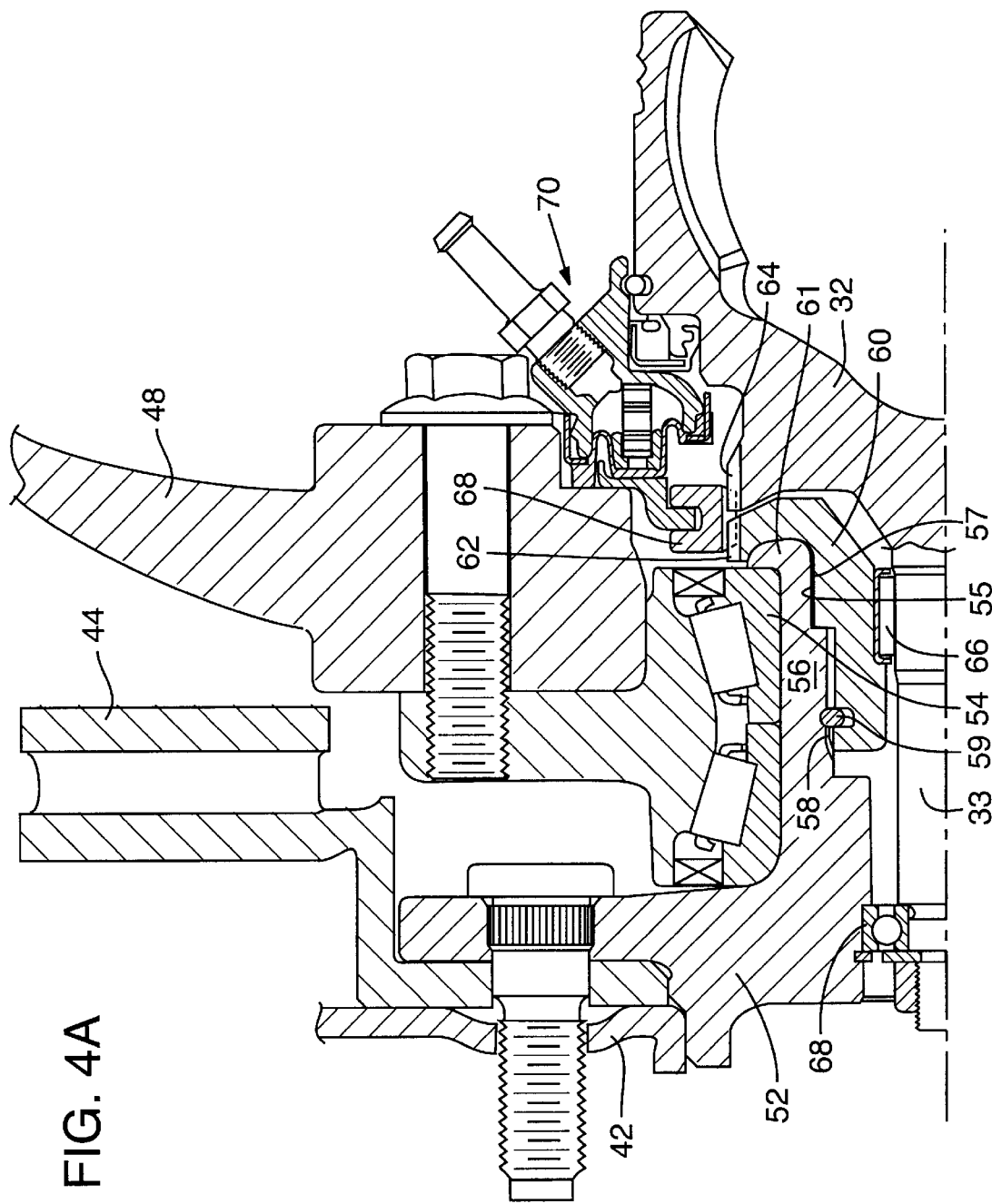

A clutch ring 68 slidably engages the splines 62, 64 of the coupler 60 and axle 32. A pneumatic actuator 70 mounted to the knuckle 48 and connected to a media source (not shown) selectively slides the clutch ring 68 along the splines 62, 64 to engage one only of the axle and coupler (for disengagement) or to engage both the axle and coupler as shown (for engagement). As shown in FIG. 4a, the mating of spindle 56 and coupler 60 via splines 58 may preferably be augmented by provision of mated non-splined surfaces 55, 59 to assure desired fit and centering of bearings 66, 68.

Version 2

Figure 5:
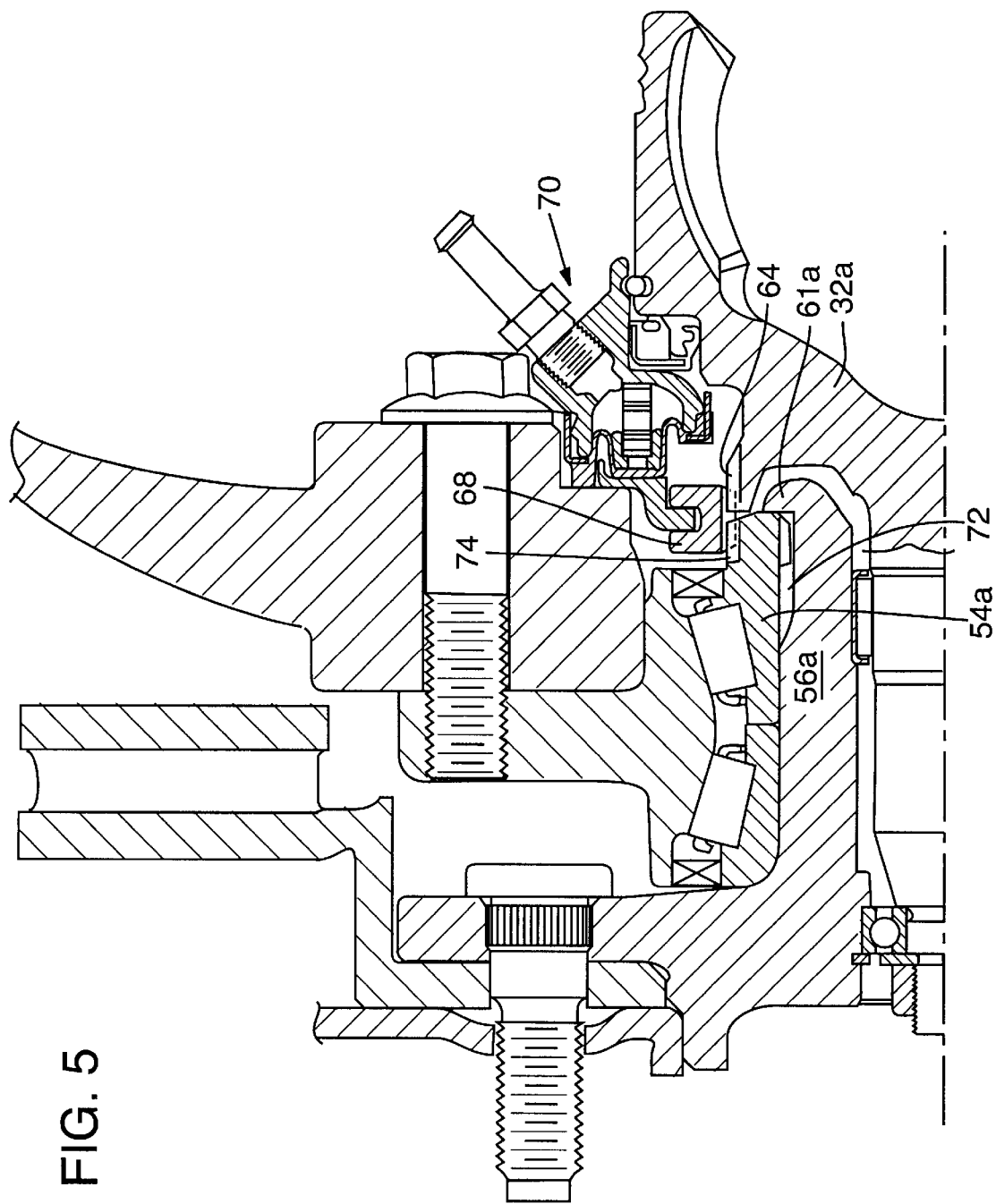

A second embodiment of the invention is illustrated in FIG. 5. In this embodiment, the bearing inner race 54a is provided with inner splines 72 for splined engagement with the spindle 56a, and outer splines 74 for splined engagement with clutch ring 68. The spindle end 61a is roll formed as illustrated to secure the bearing on the spindle while providing and maintaining the desired preload.

A portion of axle 32a adjacent the spline 74 on inner race 54a is provided with matching splines for engagement by clutch ring 68.

Version 3

Figure 6:
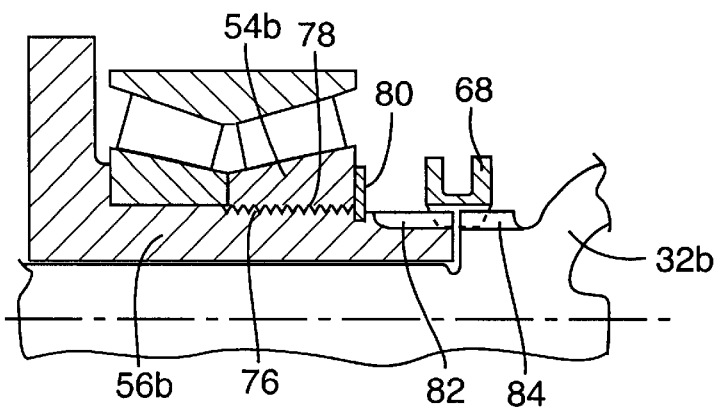

A third embodiment of the invention is illustrated in FIG. 6. The bearing inner race 54b is provided with screw threads 76 mated to screw threads 78 on the spindle 56b. A locking device, e.g., lock ring 80, locks the inner race 54b onto spindle 56b to retain a preload provided by the inner race being screwed onto the spindle. The spindle 56b extends beyond the lock ring 80 and provides splines 82 for engagement with clutch ring 68. Splines 84 of axle 32b are matched with splines 82 on the spindle to allow selective and sliding engagement with the clutch ring 68 and engagement/disengagement of the axle 32b with the spindle 56b and thus the wheel hub.

Version 4

Figure 7:
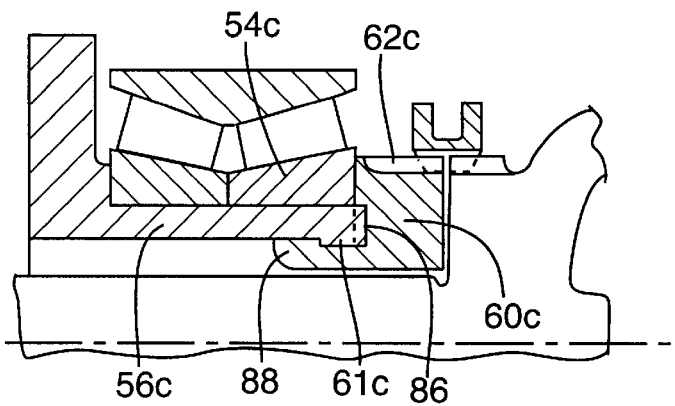

FIG. 7 illustrates a fourth embodiment of the invention. Spindle 56c is provided with an inboard end that is formed into an inwardly turned lip 61c having a dog lug engagement feature 86 (shown in dash lines). A coupler 60c having splines 62c (for engagement by a clutch ring) is roll formed at inner end 88 and behind lip 61c following preloading of the coupler against the bearing 54c.

Version 5

Figure 8:
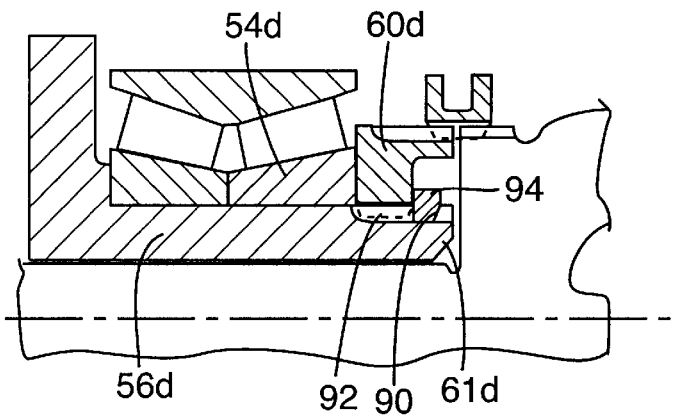
Figure 8A:
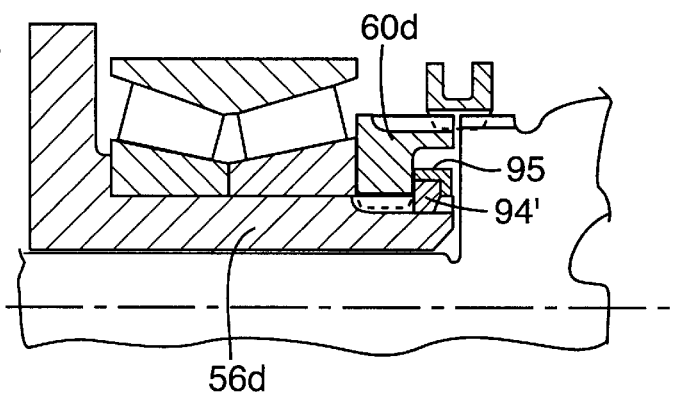

FIG. 8 illustrates a fifth embodiment of the invention. Spindle 56d is provided with a slot having angled outboard side 90 and splines 92 at end 61d. A coupler 60d is spline fit to the splines 92 and a retention ring 94 is pressed into the slot against side 90 to urge the coupler forward and thereby produce the preload on the bearing 54d and to retain that preload. FIG. 8A illustrates the same configuration with the retention ring being a split ring 94' and a band 95 retaining the split ring. The band may be assembled, formed or interference fit.

Version 6

Figure 9:
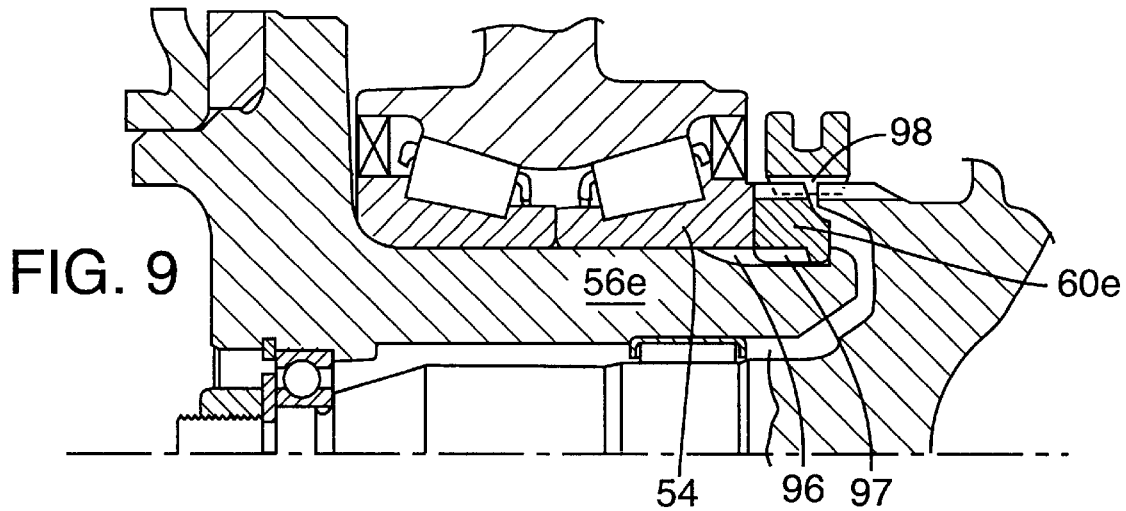

FIG. 9 illustrates a sixth embodiment of the invention. Spindle 56e is provided with a circumferential groove 96, a portion of which has splines 97. A coupler 60e is designed to slide over the end of the spindle and is then formed to match the splines 97 and to fit the smaller diameter of groove 96. In the process, the coupler is pressed axially against the bearing to preload the bearing and lock the bearing in place. External splines 98 are subsequently formed into the coupler for engagement by the clutch ring.

Version 7

Figure 10:
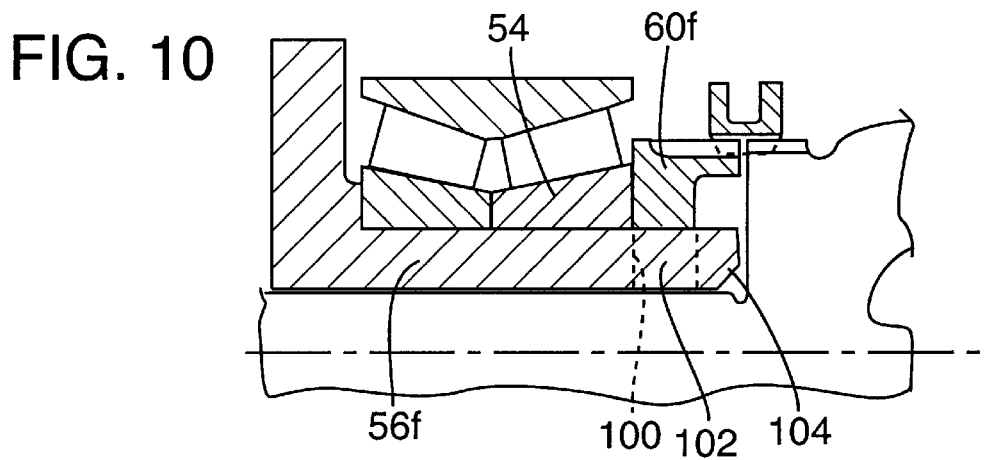

FIG. 10 illustrates a seventh embodiment of the invention.

Figure 10A:
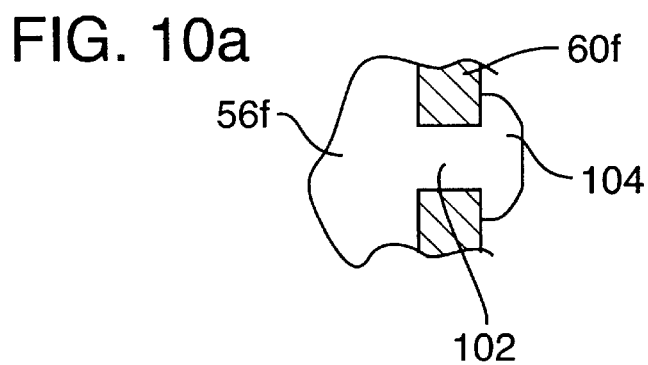

The spindle 56f is provided with fingers or dogs 100. Coupler 60f has mated fingers 102 that interlock with the fingers of the spindle (See FIG. 10a) and the protruding end 104 of the fingers 102 are then flattened in the manner of a rivet to secure the coupler and in the process preload the bearing 54.

Version 8

Figure 11:
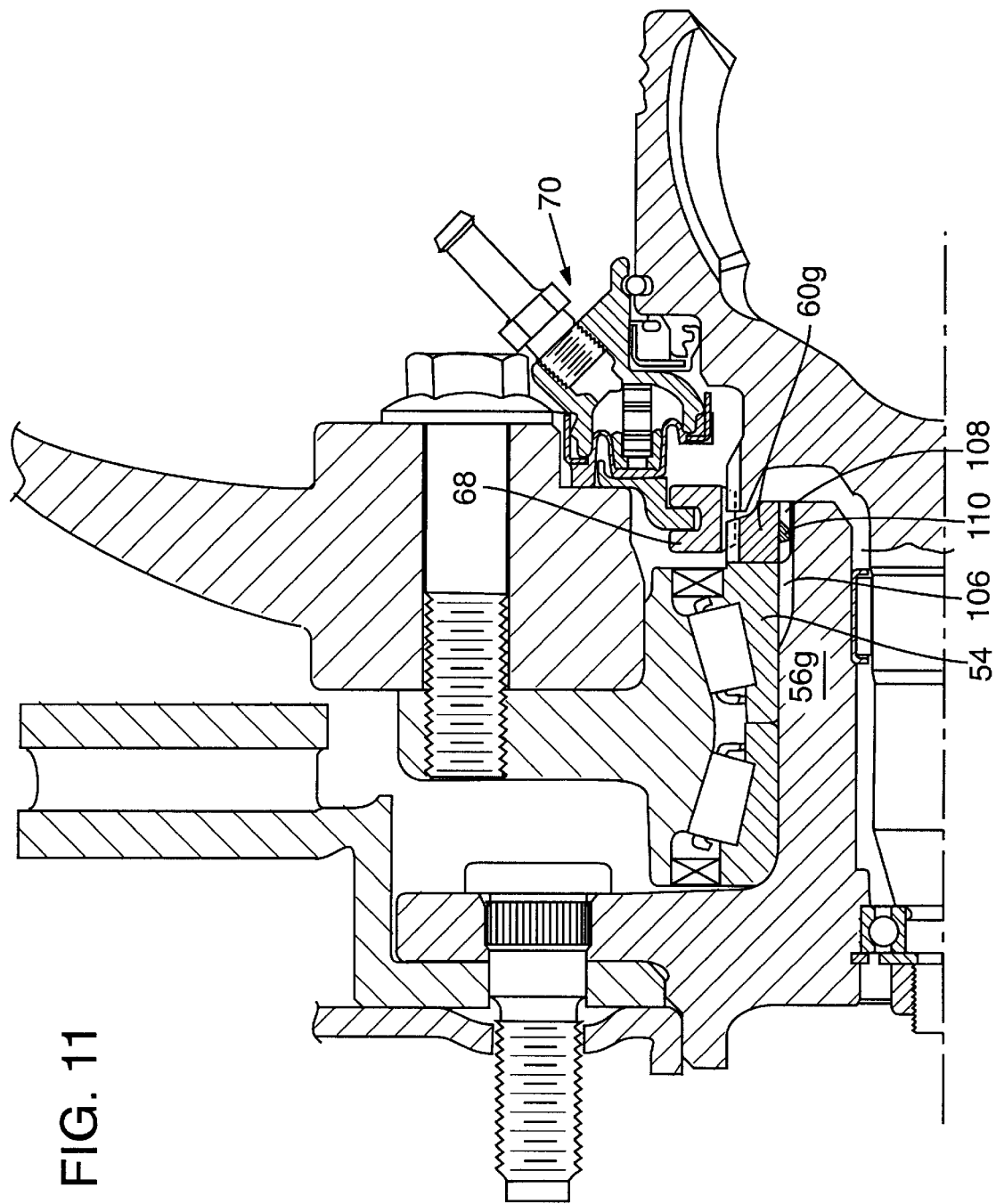

FIG. 11 illustrates an eighth embodiment of the invention. The spindle 56g is provided with splines 106 and a coupler 60g having mated splines 108 is slid onto the splines and is compressed against the bearing 54. A space between splines 106, 108 is filled with molten metal 110 to lock the coupler to the spindle and retain the preload against the bearing.

Version 9

Figure 12:
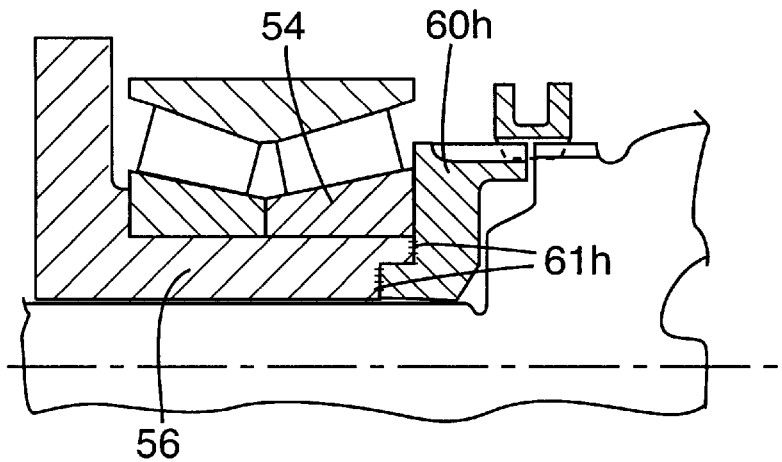
Figure 12A:
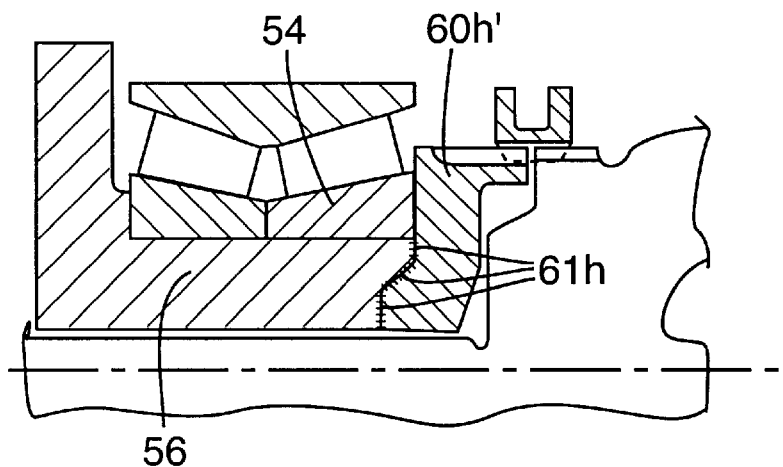
Figure 12B:
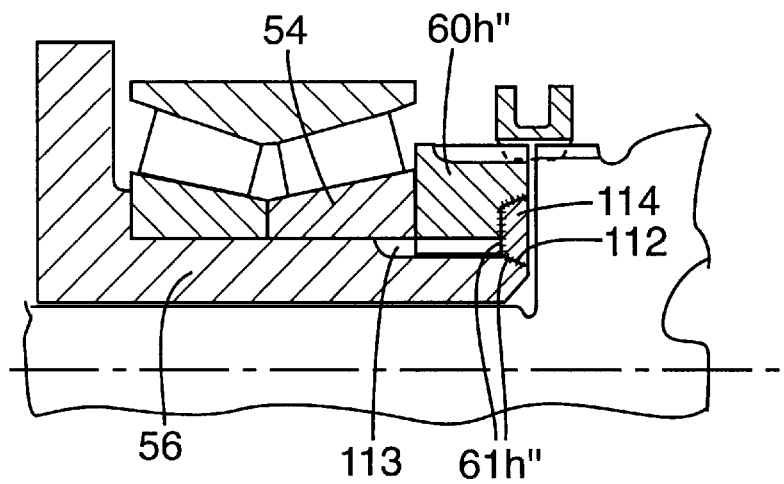

FIG. 12 illustrates a ninth embodiment of the invention. The spindle 56 is configured at end 61h to mate with the configuration of coupler 60h. The positioning of the bearing 54 is such that with the coupler abutted against the end 61h, the bearing is desirably preloaded. Coupler 60h is then spin welded (friction welded) to the end 61h. FIG. 12a shows a variation of the same embodiment. FIG. 12b is also a variation of the same embodiment. Here the coupler is slid onto the spindle end and the configuration of the coupler 60h" provides a slot 112 in which a separate ring 114 is positioned and spin welded. The version of FIG. 12b permits the use of a spline fit as indicated by reference 113.

Version 10

Figure 13:
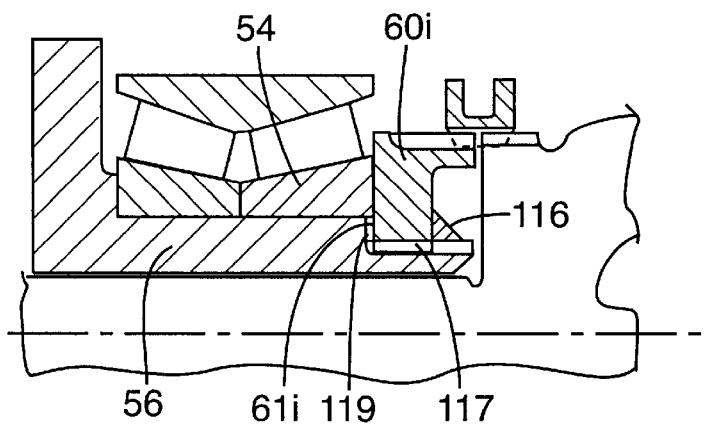
Figure 13A:
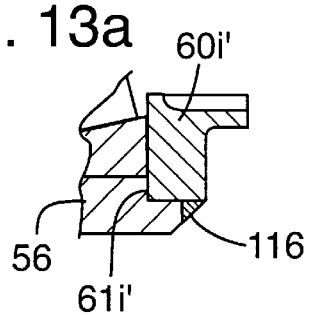
Figure 13B:
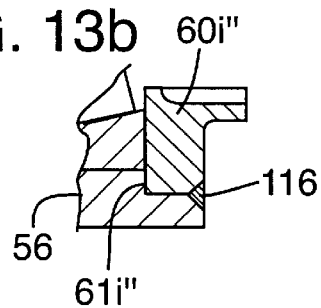

FIGS. 13, 13a and 13b are similar to FIGS. 12a and 12b. The coupler 60i, 60i', 60i" is configured to match the ends 61i, 61i' and 61i" of the spindle 56 and the spindle and coupler are welded together following preload, as indicated by weld joints 116. The coupler may also be spline fit as indicated at 117 in FIG. 13. Also, a relief space 119 is exaggerated to demonstrate that the coupler 60i is abutted/compressed against race 54.

Version 11

Figure 14:
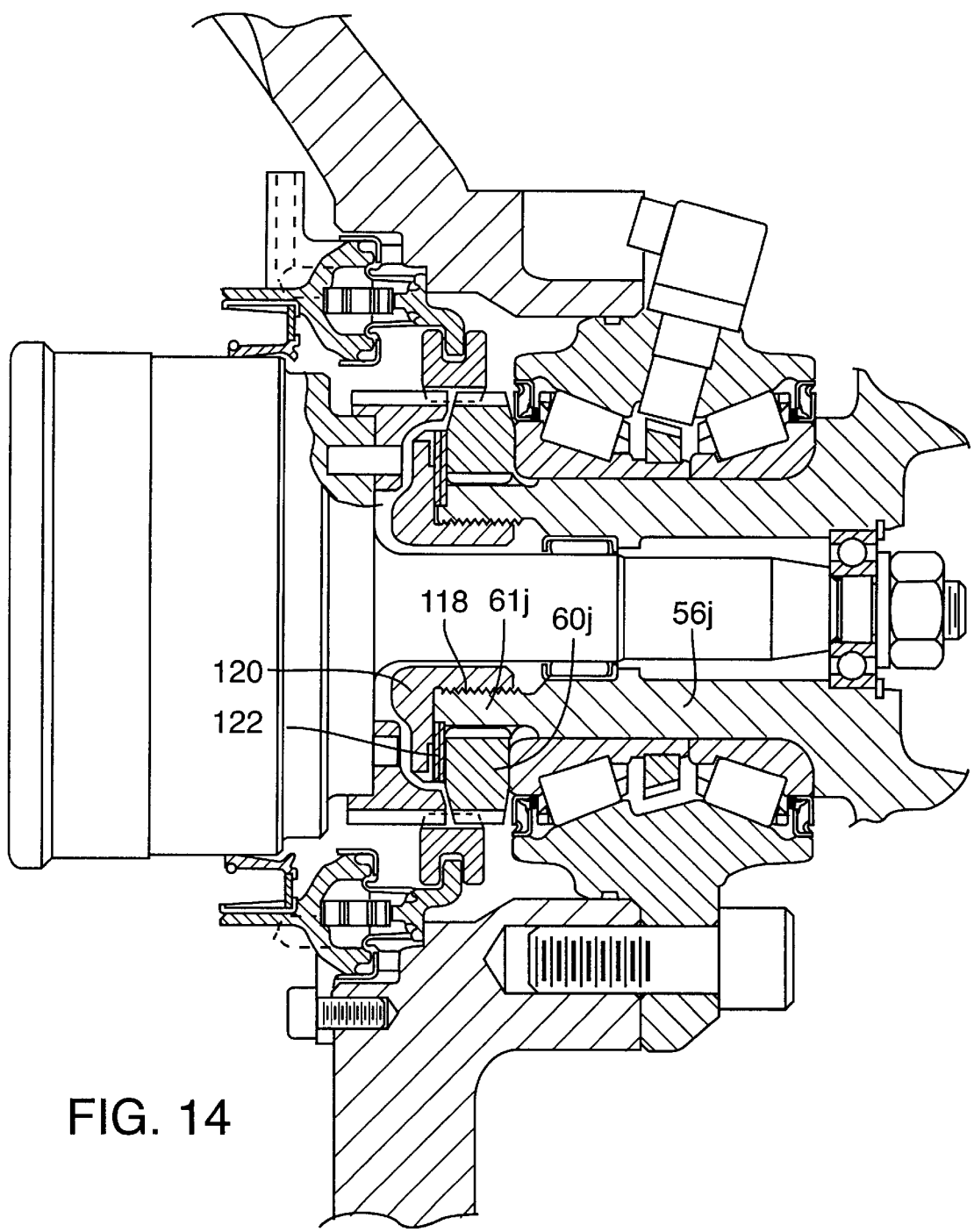

FIG. 14 illustrates an eleventh embodiment of the invention. A coupler 60j is spline fit to the spindle 56j. The inner diameter 118 of the spindle end 61j is provided with screw threads with mated screw threads provided on retainer 120. A lock washer 122 is fitted between the retainer 120 and coupler 60j. A washer suitable for this purpose is disclosed in U.S. Pat. Nos. 5,772,373 and 5,618,143.

FIG. 14a shows the concept of FIG. 14 but applied to the outboard end of spindle 36j'.

Version 12

FIGS. 15 and 15a illustrate a twelfth embodiment of the invention. A coupler 60k is mounted to spindle 56k. End 61k is roll formed against the coupler 60k to provide the desired preload on bearing 54. Coupler 60k is engaged by the clutch ring 68 to provide driving engagement between the axle 32 and the spindle/wheel hub extension 56k. To insure driving engagement as between the coupler and spindle 56k, the coupler and spindle have mated polygonal configurations 124, 126 as illustrated in FIG. 15A. Whereas a hexagonal configuration is shown, other polygonal shapes will be equally satisfactory and including other interlocking shapes such as a double D shape.

Figure 16:
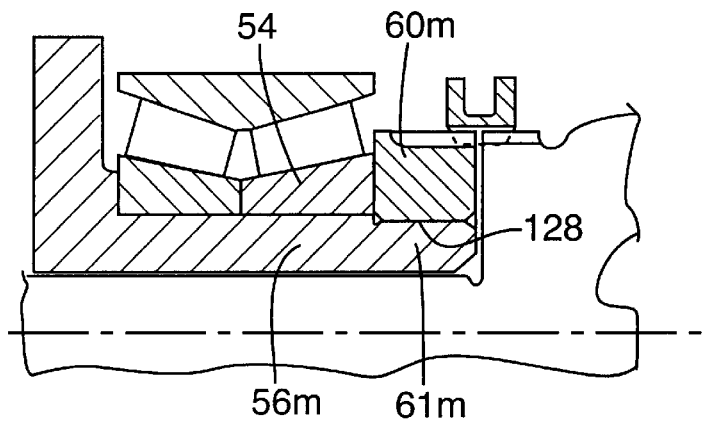
Figure 16A:
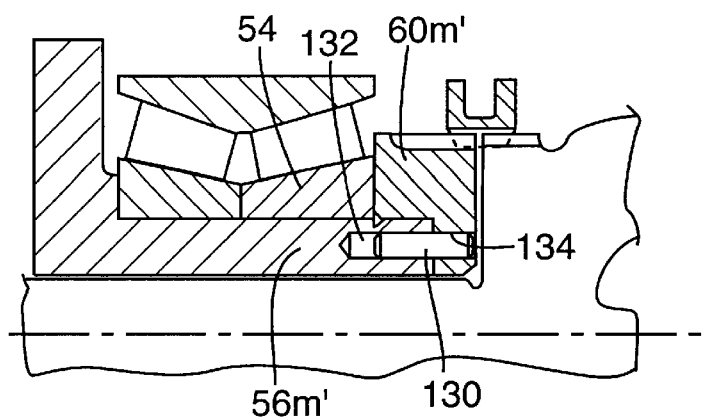

FIGS. 16 and 16a illustrate a final and thirteenth embodiment of the invention. Here the spindle end 61m is provided with an outer diameter 128 that is configured to have a larger diameter than that of coupler 60m which is force fit onto the end 61m, e.g., by heating the coupler relative to the spindle and forcing the coupler onto the spindle and against the bearing 54 so that when cooled the coupler incurs a tight and secure fit to the spindle. The outer diameter 128 may also be provided with a negative angle to enhance the tight fit. FIG. 16a illustrates a variation to the force fit by press fitting a dowel 130 into aligned holes 132, 134 in the spindle and coupler, respectively.

The above embodiments provide a number of benefits that will be apparent to those skilled in the art. Whereas the embodiments and variations are numerous, they are not all encompassing and further variations will become obvious. Accordingly, the invention is not limited to the above disclosures but is determined by the definitions provided in the accompanying claims.

The invention claimed is:

1. A wheel end assembly for a vehicle having optional four-wheel/two-wheel drive comprising:

a wheel hub having an inwardly extending spindle portion configured to have an inboard end and a shoulder spaced outwardly of said inboard end;

a wheel bearing mounted on said spindle portion for rotatably mounting said wheel hub to a vehicle chassis, said wheel bearing having an outboard end abutted against the shoulder;

said inboard end of said spindle portion roll formed against an inboard end of said bearing and producing thereby a desired preload on said bearing and securement of said preload;

said spindle portion at said inboard end being cylindrical to define an inner wall configured to provide a securement feature, a coupler having an outer diameter fitted to the inner wall and mated to the securement feature to provide common rotation of the coupler and the spindle, said coupler having an inboard end protruded from the inboard end of the spindle;

an axle portion positioned adjacent the inboard end of the coupler and rotatable relative to the coupler and defining thereby adjacent portions of the axle portion and coupler, splines provided on the adjacent portions and a spline engaging clutch ring slidable between engagement with one and engagement with both the splines of the adjacent portions.

2. A wheel end assembly as defined in claim 1 wherein the coupler is cylindrical and in cooperation with the wheel hub defines a cylindrical support, said axle portion extended into said cylindrical support and a bearing provided in said cylindrical support for relative rotation of the axle portion.

* * * * *